United States Patent [19]

Kreitman

[11] Patent Number: 5,150,225
[45] Date of Patent: Sep. 22, 1992

[54] APPARATUS FOR GENERATING A SCREENED REPRODUCTION OF AN IMAGE

[75] Inventor: Haim Kreitman, Kefar-Sava, Israel

[73] Assignee: Scitex Corporation Ltd., Herzlia, Israel

[21] Appl. No.: 524,922

[22] Filed: May 18, 1990

[51] Int. Cl.$^5$ .............................................. H04N 1/21
[52] U.S. Cl. .................................................. 358/456
[58] Field of Search ................................... 358/456–459

[56] References Cited

U.S. PATENT DOCUMENTS

| | | | |
|---|---|---|---|
| 3,916,096 | 10/1975 | Everett et al. | 178/6.6 R |
| 4,040,094 | 8/1977 | Everett et al. | 358/283 |
| 4,149,183 | 4/1979 | Pellar et al. | 358/75 |
| 4,456,924 | 6/1984 | Rosenfeld | 358/75 |
| 4,780,768 | 10/1988 | Tomohisa et al. | 358/456 |
| 4,825,298 | 4/1989 | Ikuta et al. | 358/298 |

FOREIGN PATENT DOCUMENTS 2157119 10/1985 United Kingdom .

*Primary Examiner*—Stephen Brinich
*Attorney, Agent, or Firm*—Cushman, Darby & Cushman

[57] ABSTRACT

A technique for generating a screened reproduction of an image is disclosed. The technique includes the steps of providing a representation of an original having input density values of the original, storing information representing a plurality of contours of desired dot configurations, corresponding to various possible density values for a multiplicity of screened dots, determining, for each coordinate pair of a plotter, whether the coordinate pair lies inside or outside of the contour of a dot corresponding to the input density value of the original and operating the plotter to write only if the coordinate pair lies inside the contour, thereby to produce the multiplicity of screen dots of sizes representing the input density values of the original. Apparatus employing the method is also provided.

19 Claims, 16 Drawing Sheets

| INPUT DENSITY VALUE | SCREEN DOT FROM C - DOT | LUT CONTENT ||||
|---|---|---|---|---|---|
| | | Cx | Cy | r | F |
| 20 | ○ | 0 | 0 | 0.22 | 0 |
| 40 | ○ | 0 | 0 | 0.32 | 0 |
| 105 | ◇ | -0.08 | -0.08 | 0.58 | 0 |
| 128 | ◇ | -41.6 | -41.6 | 59.2 | 1 |
| 140 | ✧ | 1.87 | 1.87 | 1.37 | 1 |
| 210 | ▢ | 0.5 | 0.5 | 0.33 | 1 |
| 255 | □ | 0.5 | 0.5 | 0 | 1 |

FIG. 7A

| INPUT DENSITY VALUE | SCREEN DOT FROM D - DOT | LUT CONTENT | | | |
|---|---|---|---|---|---|
| | | Cx | Cy | r | F |
| 20 | ◇ | -41.6 | -41.6 | 58.9 | 0 |
| 40 | ◇ | -41.6 | -41.6 | 59.0 | 0 |
| 105 | ◇ | -41.6 | -41.6 | 59.1 | 0 |
| 128 | ◇ | -41.6 | -41.6 | 59.2 | 0 |
| 140 | ⬡ | -41.6 | -41.6 | 59.3 | 1 |
| 210 | ⬡ | -41.6 | -41.6 | 59.4 | 1 |
| 255 | □ | -41.6 | -41.6 | 59.5 | 0 |

FIG. 7B

| INPUT DENSITY VALUE | SCREEN DOT FROM GRAVURE DOT | LUT CONTENT | | | |
|---|---|---|---|---|---|
| | | Cx | Cy | r | F |
| 20 | ▫ | -50.0 | 0 | 50.08 | 0 |
| 40 | ▫ | -50.0 | 0 | 50.16 | 0 |
| 105 | ▫ | -50.0 | 0 | 50.26 | 0 |
| 128 | ▫ | -50.0 | 0 | 50.35 | 0 |
| 140 | ▫ | -50.0 | 0 | 50.38 | 0 |
| 210 | ▫ | -50.0 | 0 | 50.41 | 0 |
| 255 | ▫ | -50.0 | 0 | 50.50 | 0 |

FIG. 7C

APPARATUS FOR GENERATING A SCREENED REPRODUCTION OF AN IMAGE

FIELD OF THE INVENTION

The present invention relates to screened image reproduction and more particularly to a method and apparatus for electronically generating a screened reproduction of an image.

BACKGROUND OF THE INVENTION

Electronic screening for image reproduction is well known in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded by threshold values, defining a cell memory matrix. Input digitized scanned density values of an image, such as a color separation, are compared with the threshold values, cell by cell. The results provide a on/off control input for a laser plotter.

U.S. Pat. No. 4,825,298 to Ikuta and Murai describes a technique for generating a screened reproduction of an image in which the density distribution of a given screen dot is expressed in three dimensions, wherein the area of the screen dot is expressed along X and Y axes and the density is expressed along a Z axis perpendicular thereto. A film coordinate generator generates film coordinates (u,v), corresponding to the position of an exposure beam on a recording film which is detected by encoders, which is in turn supplied to a screen coordinate generator to be converted into virtual screen coordinates (x,y). A beam control signal generator receives the coordinates (x,y) and an image signal corresponding to the position of the exposure beam to output a beam control signal indicting lighting of the exposure beam when one of the coordinates (x,y) is between upper and lower limit values, corresponding to the same, which are previously decided for each combination of the other of the coordinates (x,y) and the density value of the image signal.

U.K. Published Patent Application 2,157,119A to Ikuta describes apparatus which operates similarly to the technique of U.S. Pat. No. 4,456,924 but does not employ a matrix memory. Instead, the threshold function is calculated on the fly in real time or near real time. This apparatus is limited to relatively simple dot configurations.

The technique of U.S. Pat. No. 4,825,298 to Ikuta and Murai has the disadvantage that its memory requirements are extremely high.

SUMMARY OF THE INVENTION

The present invention seeks to provide an improved technique for generating a screened reproduction of an image.

There is thus provided in accordance with a preferred embodiment of the present invention a technique for generating a screened reproduction of an image comprising the steps of:

providing a representation of an original having input density values of the original, storing information representing a plurality of contours of desired dot configurations, corresponding to various possible density values for the multiplicity of screened dots, for each coordinate pair of a plotter, determining whether the coordinate pair lies inside or outside of the contour corresponding to the input density value of the original and operating the plotter to write only if the coordinate pair lies inside the contour, thereby to produce the multiplicity of screen dots of sizes representing the input density values of the original.

Additionally in accordance with a preferred embodiment of the invention there is provided apparatus for generating a screened reproduction of an image including:

apparatus for providing a representation of an original having input density values of the original, apparatus for storing information representing a plurality of contours of desired dot configurations, corresponding to various possible density values for a multiplicity of screened dots, apparatus for determining, for each coordinate pair of a plotter, whether the coordinate pair lies inside or outside of the contour of a dot corresponding to the input density value of the original and apparatus for operating the plotter to write only if the coordinate pair lies inside the contour, thereby to produce the multiplicity of screen dots of sizes representing the input density values of the original.

In accordance with a preferred embodiment of the invention, the stored information representing a plurality of contours stores only octants of the contour. Preferably the stored information representing a plurality of contours is represented by arcs centered on given locations.

Preferably the representation of the original is produced by a laser scanner having a first pixel resolution.

Preferably the multiplicity of screen dots are arranged in a screen grid having a second resolution, coarser than the first pixel resolution and the representation of the original is arranged in a scanner grid pattern and said screen grid is angled with respect to the scanner grid pattern.

In accordance with a preferred embodiment of the invention, the stored information comprises information relating to a plurality of selectable different dot configurations.

BRIEF DESCRIPTION OF THE DRAWINGS

The present invention will be more fully understood and appreciated from the following detailed description, taken in conjunction with the drawings in which:

FIGS. 7A, 7B and 7C are each illustrations of part of a look up table which stores information defining dot contours for each input density value for a given type of dot configuration;

DETAILED DESCRIPTION OF A PREFERRED EMBODIMENT

Figure 1:
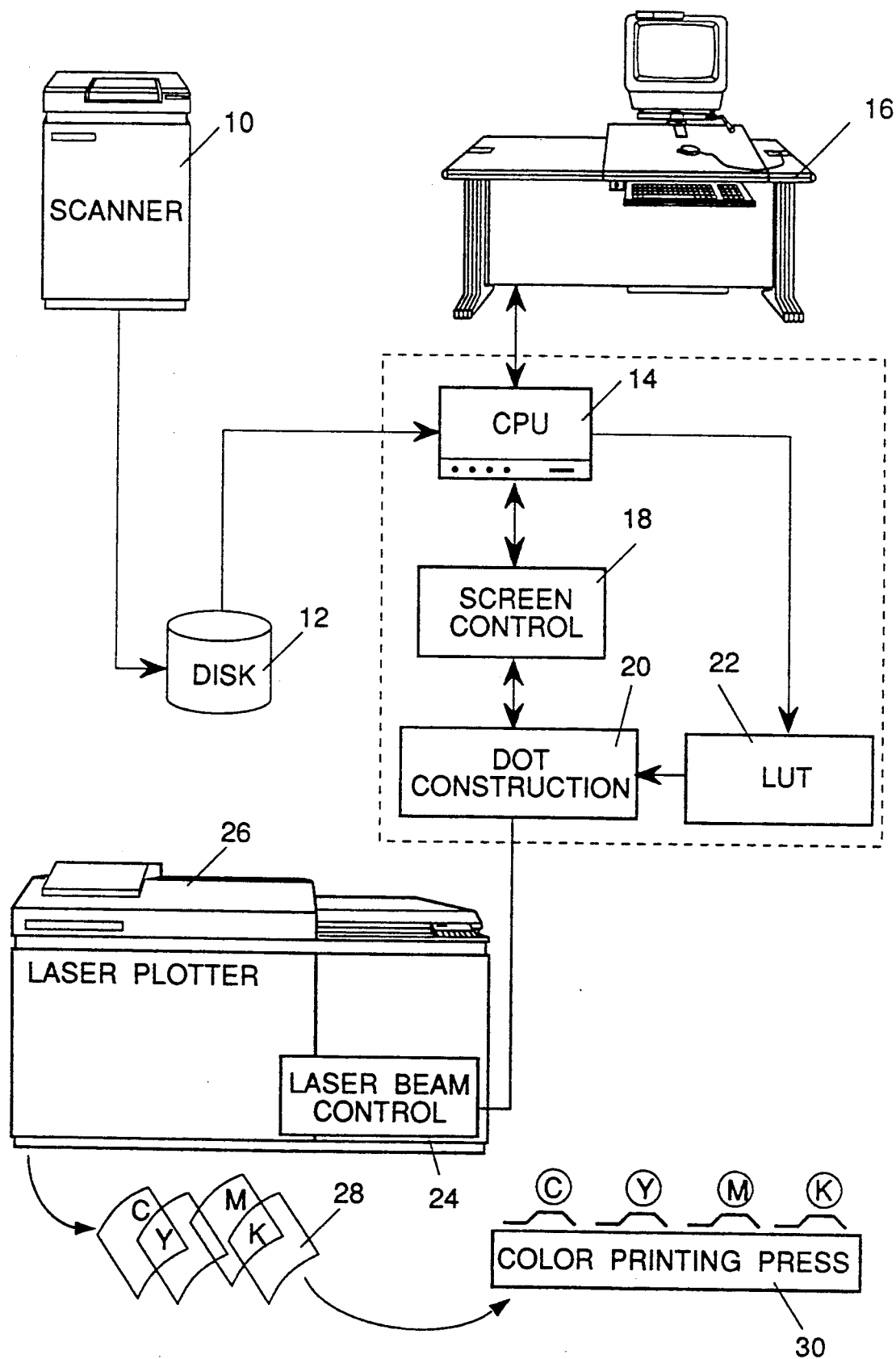
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on an image data disc 12 or any other suitable storage medium, which is accessible by a CPU 14, such as an Intel 80386. Interfacing with the CPU is an interactive workstation 16, such as a Scitex Prisma, manufactured and sold by Scitex Corporation Ltd. of Herzlia, Israel.

CPU 14 interfaces with screen control circuitry 18, which in turn governs the operation of dot construction circuitry 20. Dot construction circuitry 20 receives dot contour information from a look up table (LUT) 22, which may be loaded by CPU 14. Dot construction circuitry 20 provides a control output to laser beam control circuitry 24 in a laser plotter 26, such as a Raystar, manufactured and sold by Scitex Corporation Ltd. of Herzlia, Israel.

Laser plotter 26 produces halftone film color separations 28 which are employed in a conventional process color printing press 30, to produce process color prints.

Screen control circuitry 18 and dot construction circuitry 20 are illustrated in greater detail in FIG. 10 and will be described hereinbelow.

Figure 2:
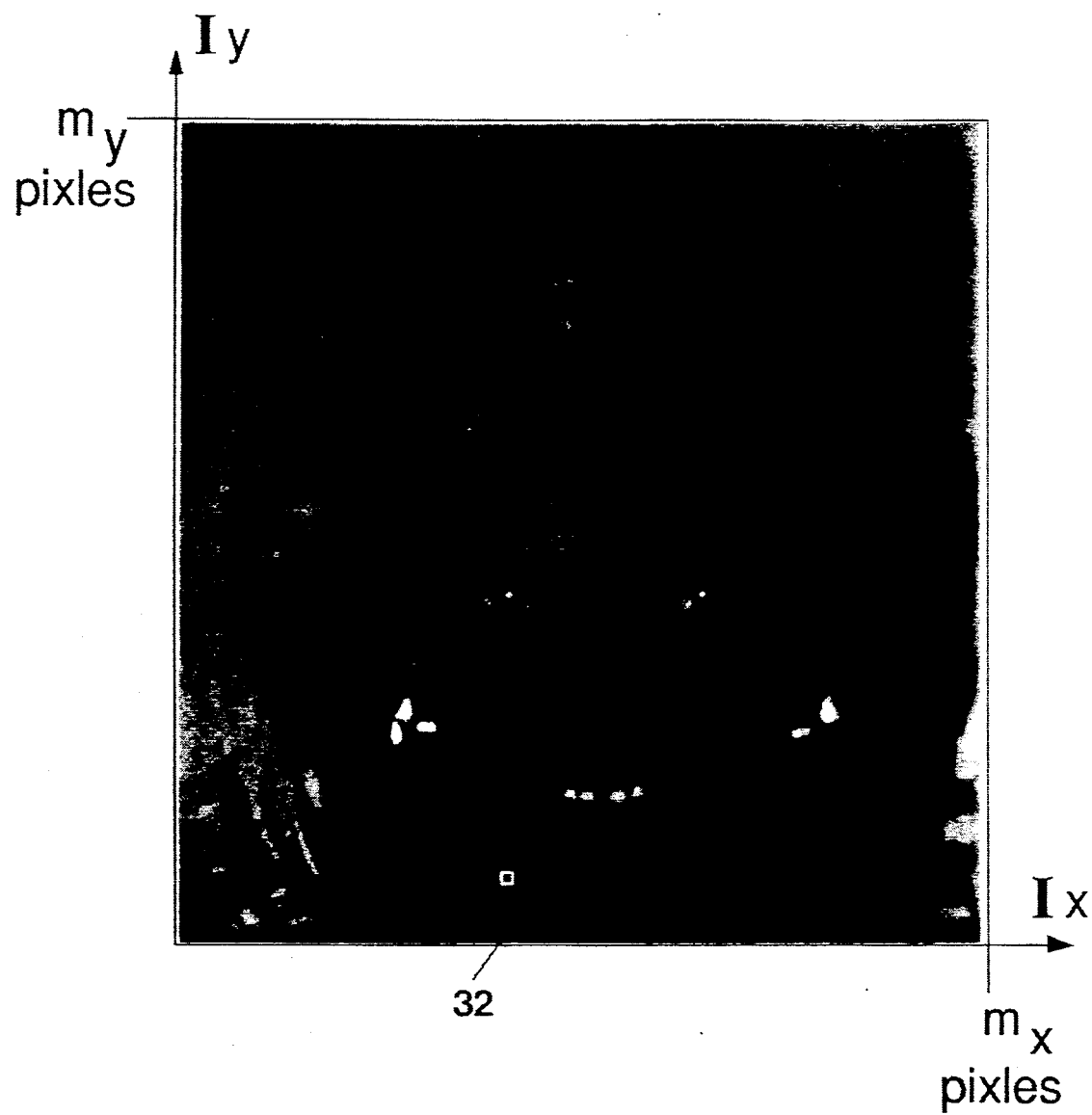
FIG. 2 is an illustration of a typical halftone color separation.
Figure 3:
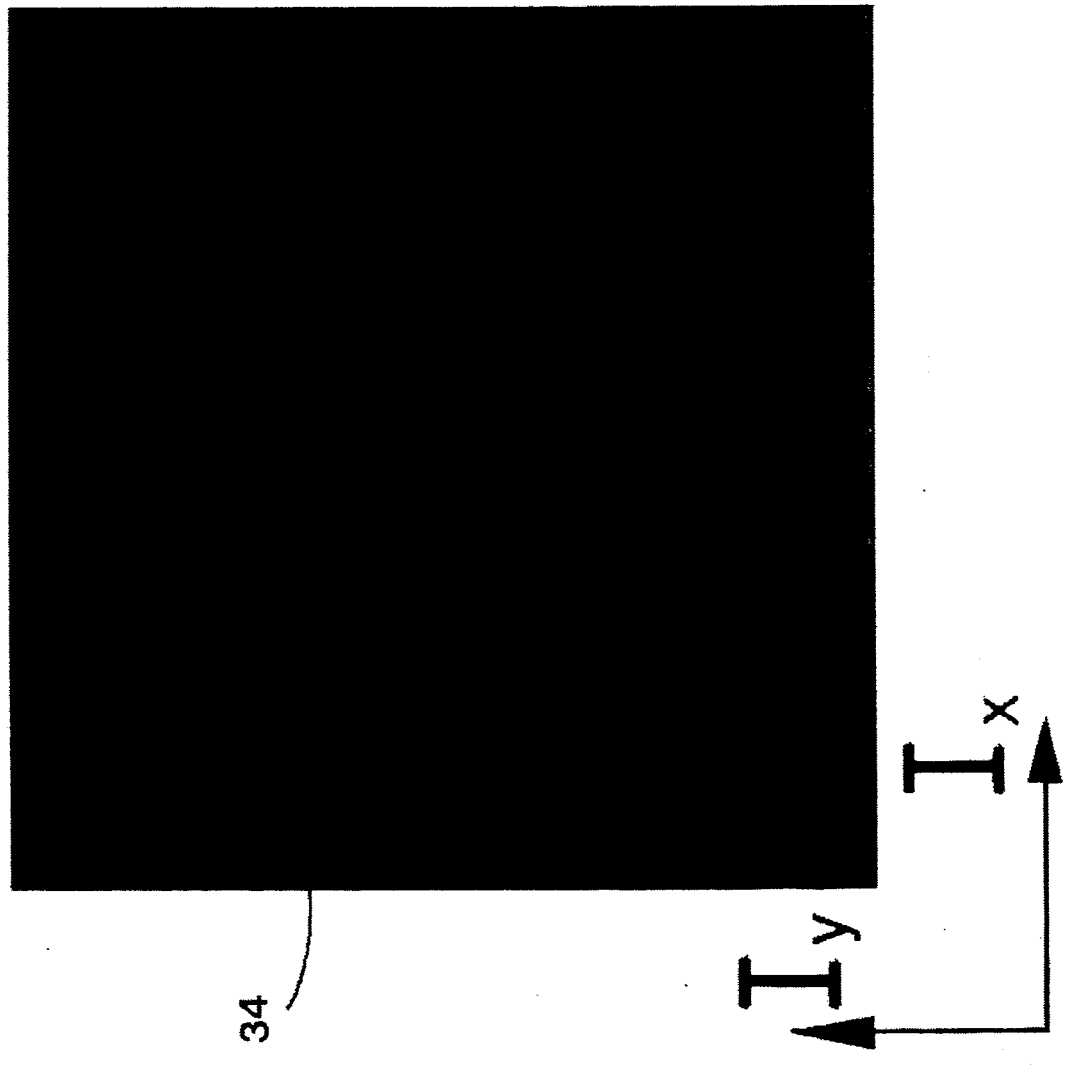
FIG. 3 is an enlarged illustration of a small portion of the halftone color separation of FIG. 2.

Reference is now made to FIGS. 2 and 3. FIG. 2 illustrates a typical halftone color separation which is stored on disc 12. FIG. 3 illustrates in enlarged detail, a small area 32 indicated on FIG. 2. It is noted that the gray level over area 32 varies thereacross.

The halftone color separation in general and the small area 32 in particular are hereinafter termed the input image and are divided into a first multiplicity of pixels 34 which are arranged along coordinates $I_x$ and $I_y$. Pixels 34 typically have a resolution of 100-400 pixels per inch along each of the coordinate axes of the input image.

Figure 4:
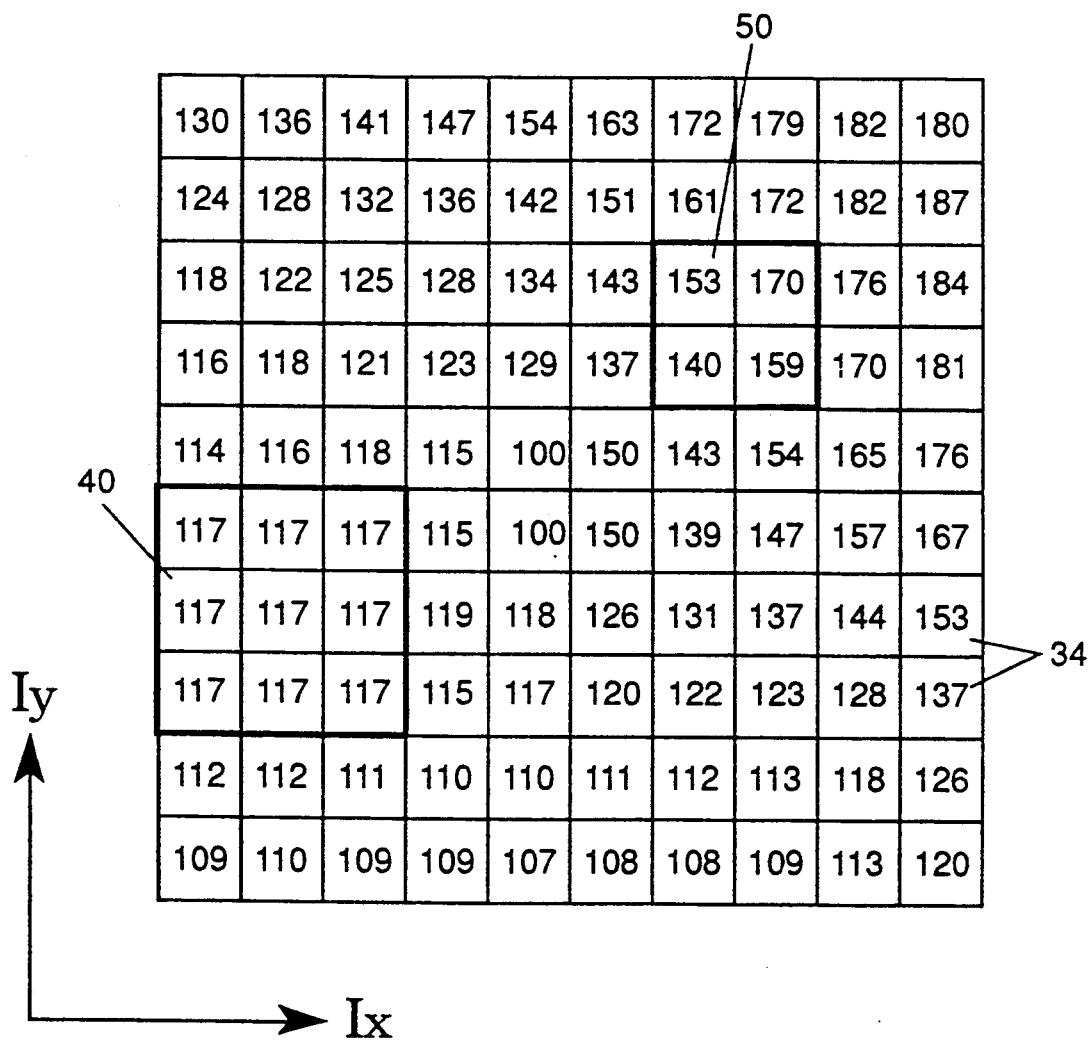
FIG. 4 an illustration of pixel-by-pixel input density values for the small portion of the color separation shown in FIG. 3.

Each average gray level for a pixel 34 is represented digitally by an input density level. There are typically provided 256 different input density levels, 0 being the lightest and 255 being the blackest. FIG. 4 illustrates the input density values for the pixels 34 of FIG. 3.

It is a particular feature of the present invention that in contrast to the prior art, the apparatus of the present invention stores output dot contour information for each of 256 input density values. The output dot contours are preferably stored in LUT 22 (FIG. 1). The output dot contours are generally defined in accordance with an output dot density distribution corresponding to each given output dot configuration.

Figure 5:
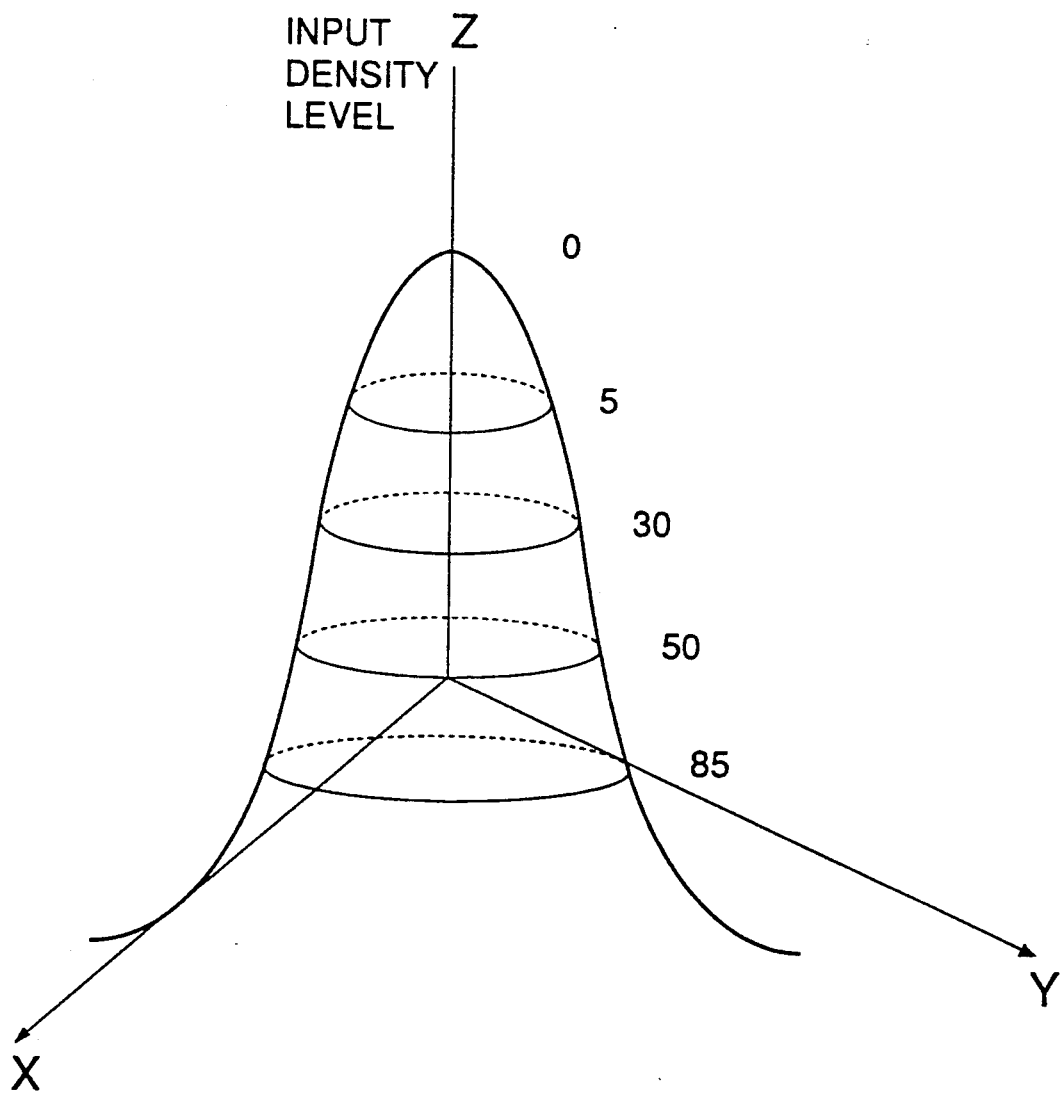
FIG. 5 is an illustration of the derivation of dot density contours from a dot density distribution for a given dot configuration.

FIG. 5 illustrates an output dot density distribution for a conventional C dot, which is used in process color printing. FIG. 5 shows the various cross sections of the output density dot distribution for various corresponding input density values, the cross section defining the dot contour corresponding to each input density value.

Figure 6A:
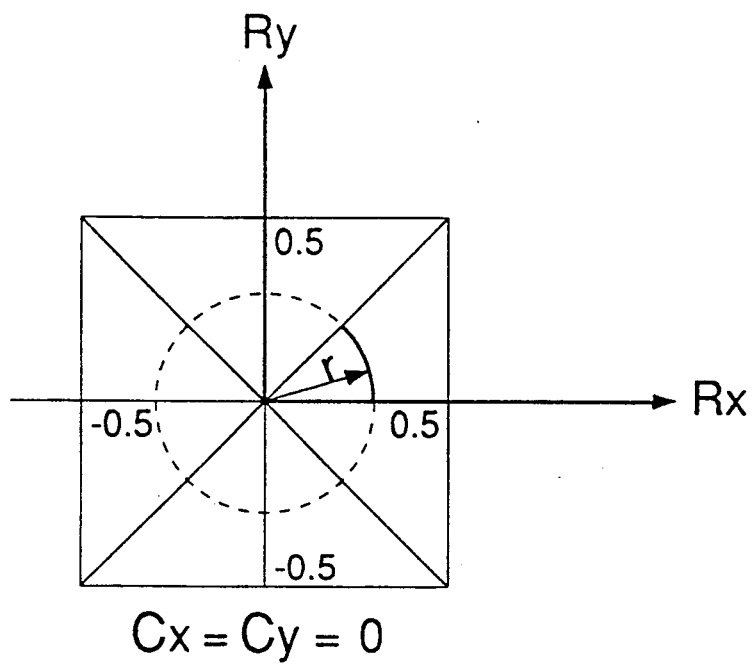
FIGS. 6A and 6B are illustrations of the construction of dot contours for octant centers located respectively inside and outside the dot.
Figure 6B:
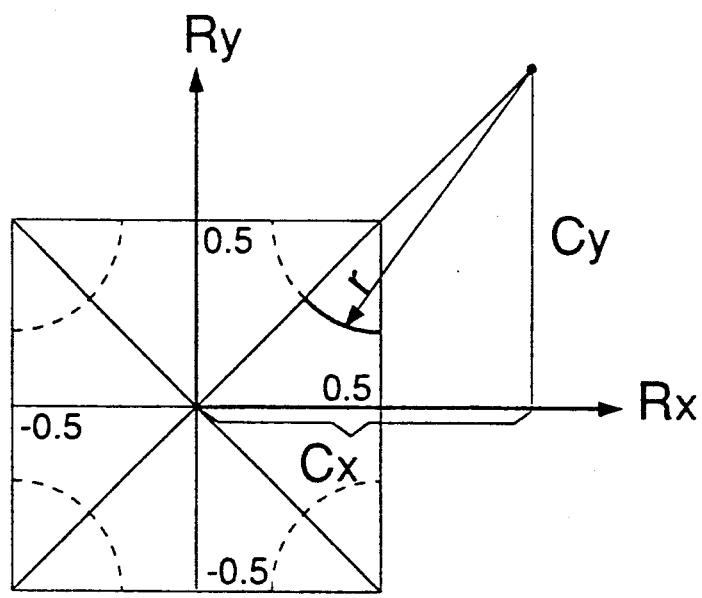

Reference is now made to FIGS. 6A and 6B, which illustrate the construction of dot contours from octants, for two cases, those wherein the center of the arc of the octant is within the dot contour (FIG. 6A) and those wherein the center of the arc of the octant is outside the dot contour (FIG. 6B).

It may be appreciated from a consideration of FIGS. 6A and 6B that the dot contour is fully defined by the following parameters for each octant:

$C_x$, $C_y$, the x and y coordinates of the center of the arc;

r, the radius of the arc;

F, a flag indicating whether the center of the arc is within or without the dot and having the possible values of 0 and 1.

The internal coordinates of each cell are given as $R_x$, $R_y$.

Reference is now made to FIGS. 7A, 7B and 7C, which illustrate portions of the contents of LUT 22 (FIG. 1) for three different conventional output dot configurations, C dot, D dot and gravure dot respectively. It is seen that for each dot configuration, and for each input density value a given dot contour is defined by values $C_x$, $C_y$, r and F. It is appreciated that as the result of dot symmetry, the values for only one octant are given. In practice, however, values for all eight of the octants are normally stored, although this need not necessarily be the case.

Figure 8A:
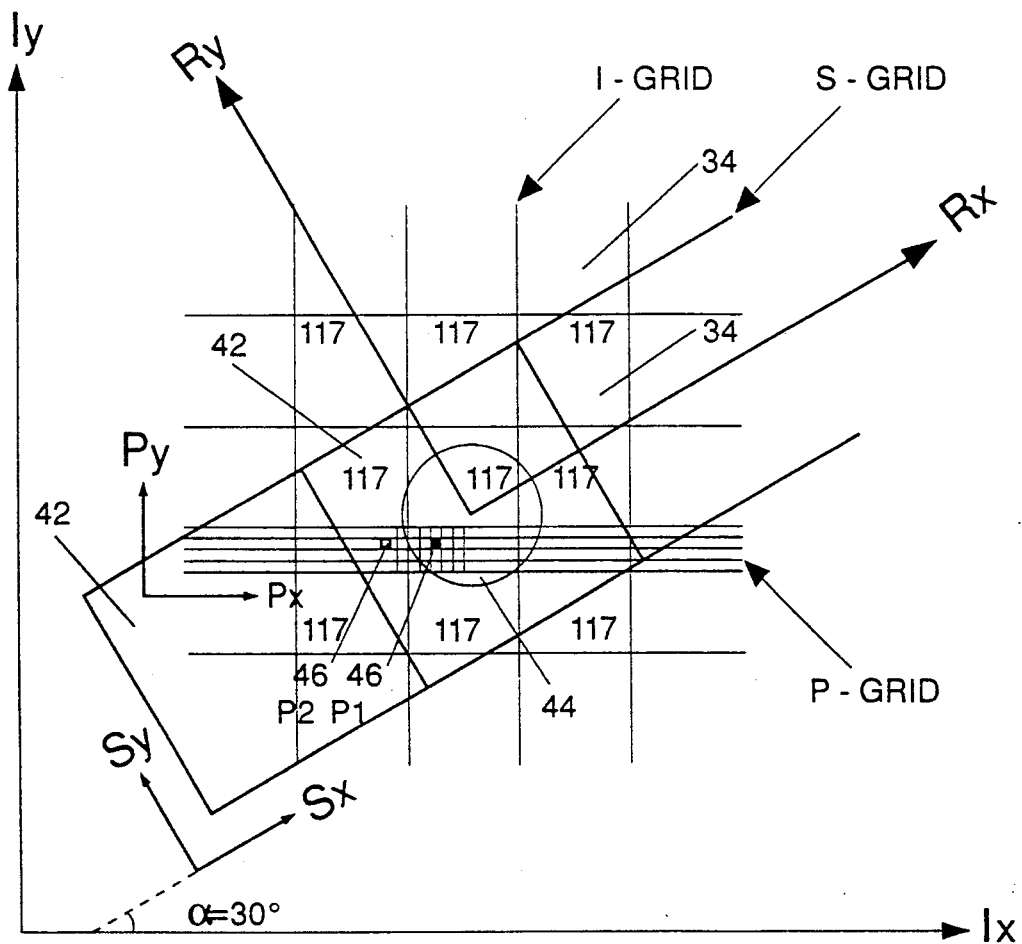
FIGS. 8A, 8B and 8C illustrate the construction of a dot using a laser plotter.

Reference is now made to FIG. 8A, which illustrates the construction of an output dot employing a rotated screen having a mesh different from that of the scanner 10, for a portion 40 of the image illustrated in FIGS. 3 and 4. The input density values for the pixels 34 are indicated within each pixel and it is seen that they are all uniform.

The rotated screen defines a second multiplicity of cells 42, lying along coordinate axes $S_x$, $S_y$, which are rotated with respect to coordinate axes $I_x$, $I_y$ by a given angle, typically 30 degrees. Each output dot 44, also referred to as a screen dot, is centered within a cell 42. The mesh of the rotated screen defines the size of cells 42 and of dots 44 and provides output dots having a typical resolution of 60-200 dots per inch in the output image. The internal coordinates of each cell are given as $R_x$, $R_y$.

Each output dot 44 is made up of a third multiplicity of points 46 which are produced by laser plotter 26 (FIG. 1), which operates along coordinates $P_x$, $P_y$, which are normally parallel to coordinates $I_x$, $I_y$ and normally have a significantly higher resolution than pixels 34. Typical resolution of points 46 is 800-5000 points per inch of The laser plotter is controlled to write for all locations within the dot contour defined by LUT 22, as indicated at P1 and not to write at all locations outside the dot contour, as indicated at P2.

Figure 8B:
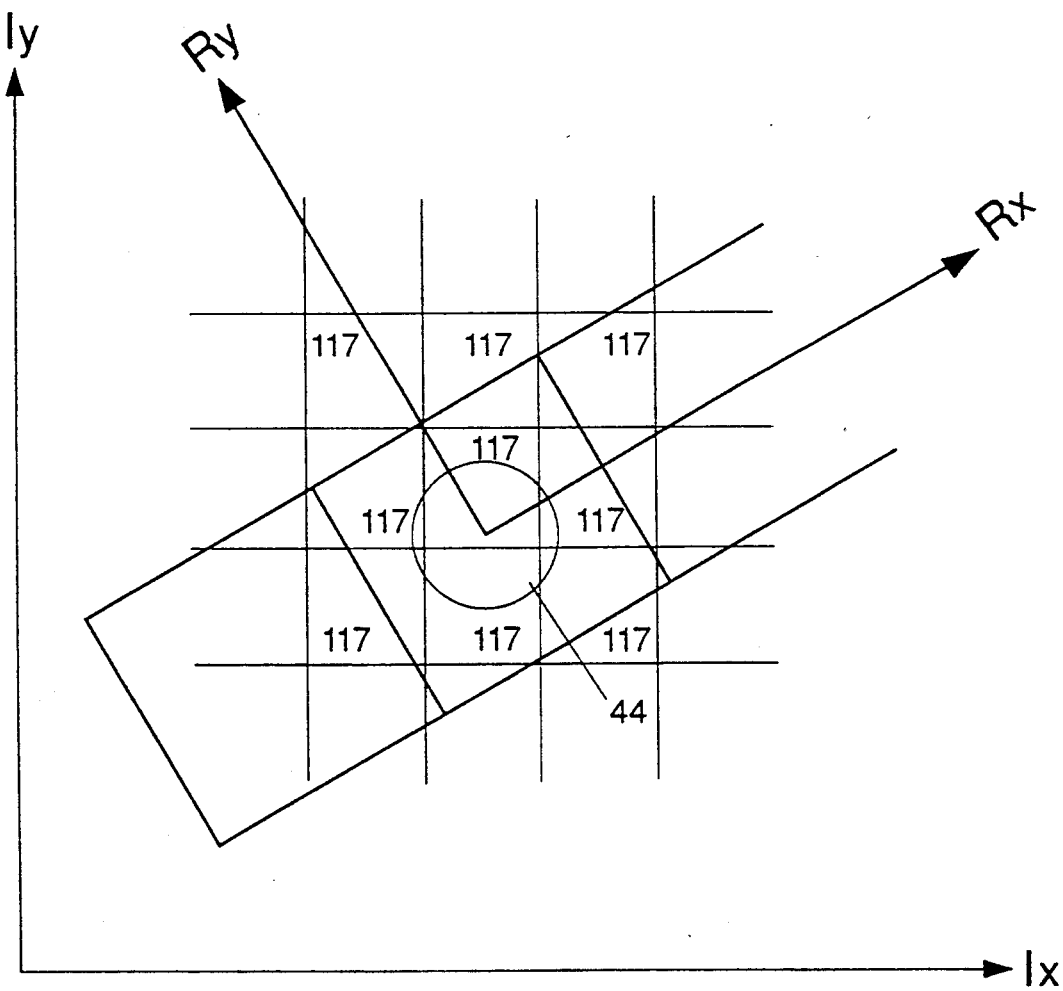

FIG. 8B illustrates a completed dot produced by the technique described in FIG. 8A for the same location on the input image.

Figure 8C:
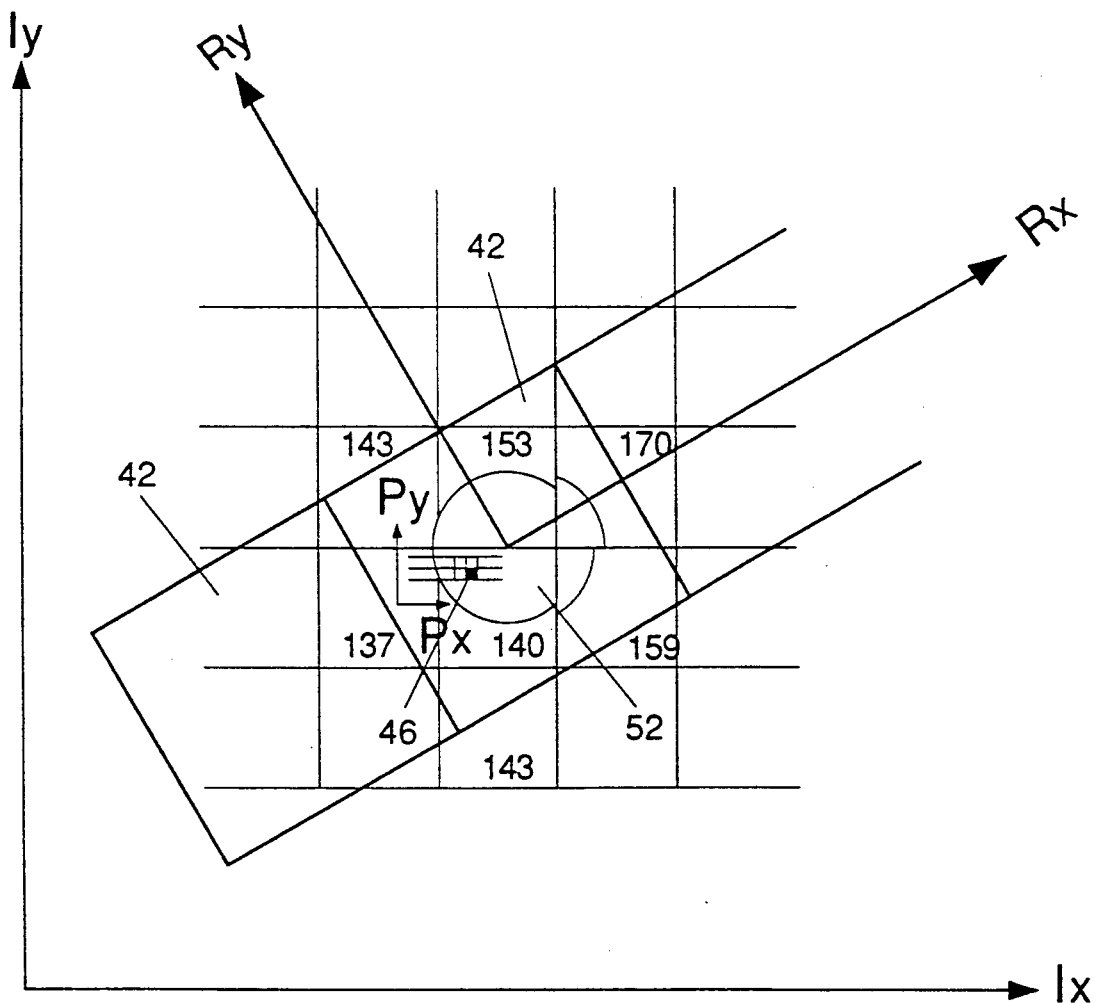

Reference is now made to FIG. 8C, which illustrates the construction of an output dot employing a rotated screen having a mesh different from that of the scanner 10, for a portion 50 of the image illustrated in FIGS. 3 and 4. The input density values for the pixels 34 are indicated within each pixel and it is seen that they differ from each other.

As in the example of FIGS. 8A and 8B, the rotated screen defines a second multiplicity of cells 42, lying along coordinate axes $S_x$, $S_y$, which are rotated with respect to coordinate axes $I_x$, $I_y$ by a given screen rotation angle $\alpha$, typically 30 degrees. Each output dot 52, also referred to as a screen dot, is centered within a cell 42. The mesh of the rotated screen defines the size of cells 42 and of dots 52 and provides output dots having a typical resolution of 60-200 dots per inch in the output image. The internal coordinates of each cell are given as $R_x$, $R_y$.

It is appreciated from a consideration of FIG. 8C, that the output dot contour along each portion of the circumference of the dot is a function of the input density value for the pixel 34 over which it lies. Thus where the input density value is relatively low, such as 140, the dot contour corresponds to a relatively small dot area and where the input density value is high, such as 170, the dot contour corresponds to a relatively large dot area. An output dot which overlies pixels 34 having different input density values is thus asymmetric in a manner generally corresponding to the asymmetry of the input density values of the pixels 34 represented by the output dot.

As in the example of FIGS. 8A and 8B, each output dot 52 is made up of a third multiplicity of points 46 which are produced by laser plotter 26 (FIG. 1), which operates along coordinates $P_x$, $P_y$, which are normally parallel to coordinates $I_x$, $I_y$ and normally have a significantly higher resolution than pixels 34. Typical resolution of points 46 is 800-5000 points per inch of the output image.

Figure 9A:
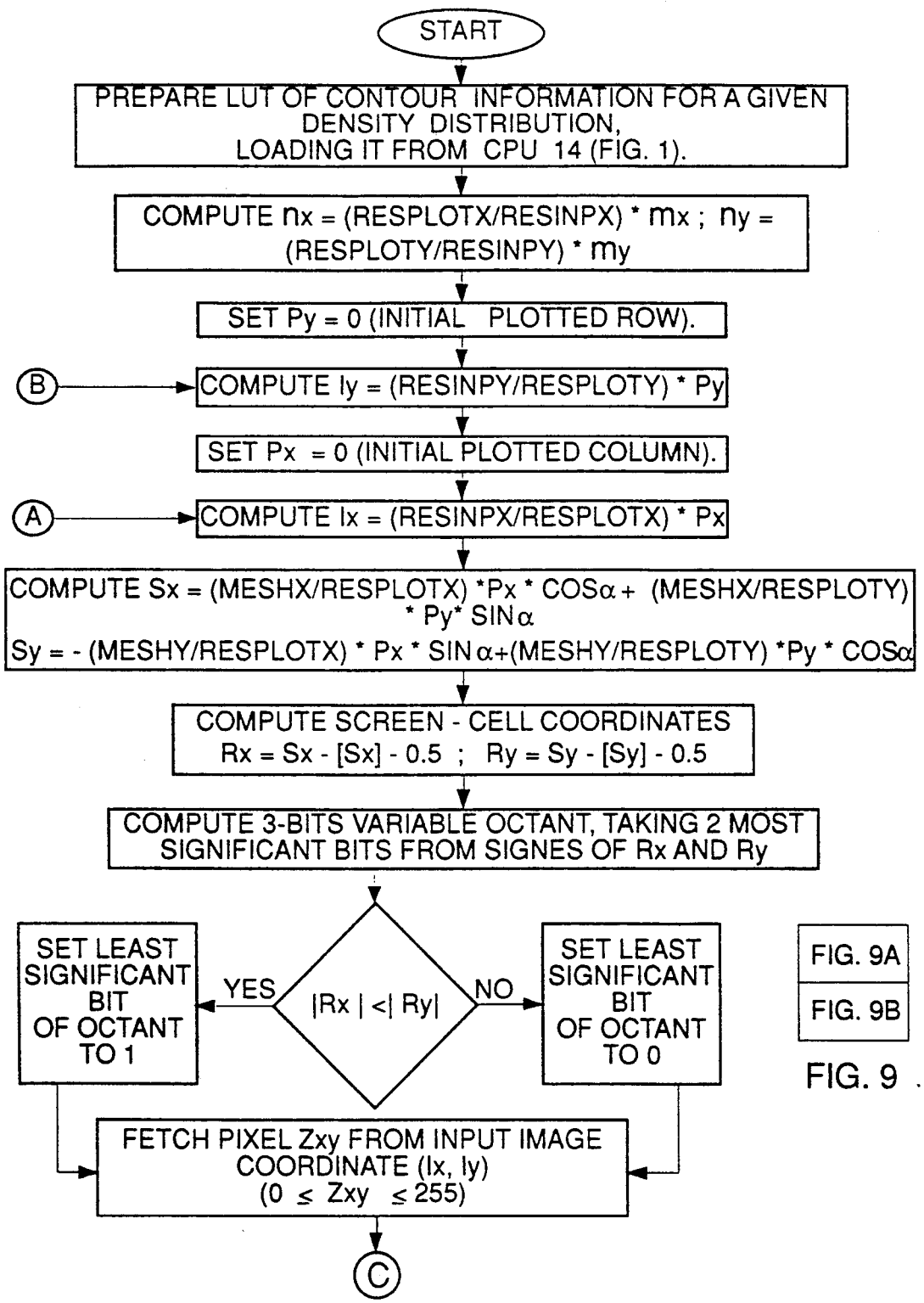
FIGS. 9A and 9B a detailed flowchart illustrating operation of the dot generation apparatus of the system of FIG. 1 using the dot contour information of the type shown in FIGS. 7A, 7B and 7C in controlling the laser printer to produce desired printing dots.
Figure 9B:
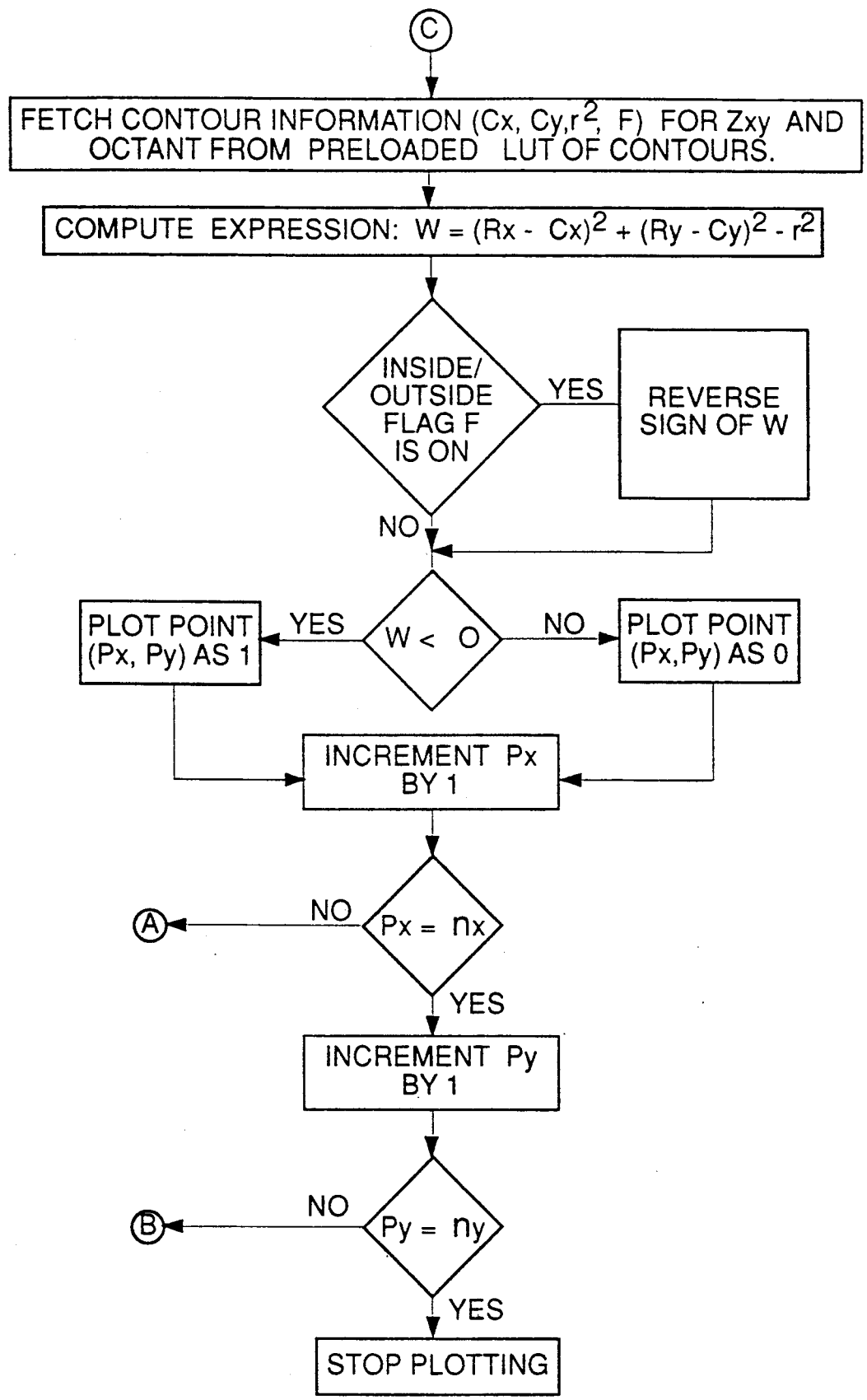

Reference is now made to FIG. 9, which illustrates the computer instructions given to carry out the invention. The flow chart of FIG. 9 is self-explanatory and employs terms defined as follows:

resInpX (resInpY)—resolution of a given input image in X (Y) direction measured in pixels per inch $m_x$ ($m_y$)—number of columns (rows) in a given input image $I_x$ ($I_y$)—current input image column (row). It varies from 0 to $m_x$ ($m_y$), not including upper limit resPlotX (resPlotY)—resolution of plotter in X (Y) direction measured in points per inch $n_x$ ($n_y$)—number of columns (rows) in plotter output image $P_x$ ($P_y$)—current plotted column (row). It varies from 0 to $n_x$ ($n_y$), not including upper limit $\alpha$—screen rotation angle meshX (meshY)—number of dots per inch in direction $\alpha(\alpha+90°)$ $S_x$ ($S_y$)—current dot number in rotated coordinate system in direction $\alpha(\alpha+90°)$ For any real number $A - [A]$ means: maximal integer which is less than or equal to A.

Figure 10:
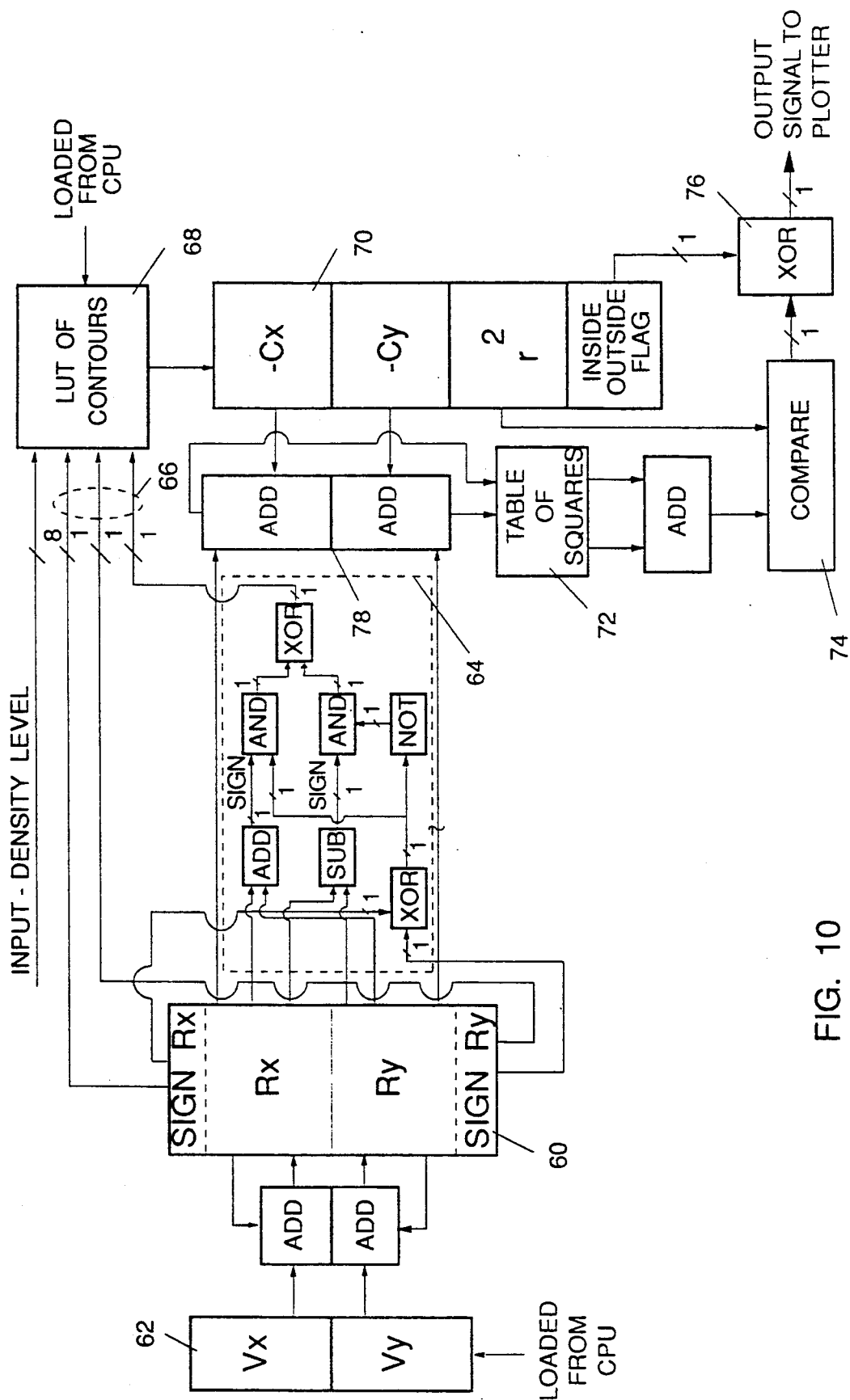
FIG. 10 is a block diagram illustration of electronic circuitry employed in the system of FIG. 1.

FIG. 10 describes circuitry 18 and 20 (FIG. 1). A register 60 stores current screen-cell coordinates $R_x$, $R_y$ obtained through addition of contents $V_x$, $V_y$, of a preloaded step increment register 62 with the previous values stored in register 60.

An octant 66 is composed of two most significant bits, namely the sign bits of $R_x$ and $R_y$ stored in register 60 and of a least significant bit computed by circuitry 64 which operates on the values of $R_x$ and $R_y$ as shown in FIG. 10.

An LUT of contours 68, preloaded from CPU 14 (FIG. 1), receives the octant 66 and a current input density level for the current screen-cell coordinates $R_x$, $R_y$ and produces the octant information $C_x$, $C_y$, $r^2$ and F, the flag indicating whether or not the center of the arc is within or without the dot, for storage in a register 70.

Adders 78 and 80 and a table of squares 72 serve to compute the expression $(C_x - R_x)^2 + (C_y - P_y)^2$ from the information in registers 60 and 70. A comparator 74 compares the result of adder 80 with the $r^2$ value stored in register 70. The output of comparator 74 and the value of F stored in register 70 are used to drive an XOR gate 76 which, in turn, controls the laser beam 24 (FIG. 1).

Figure 11:
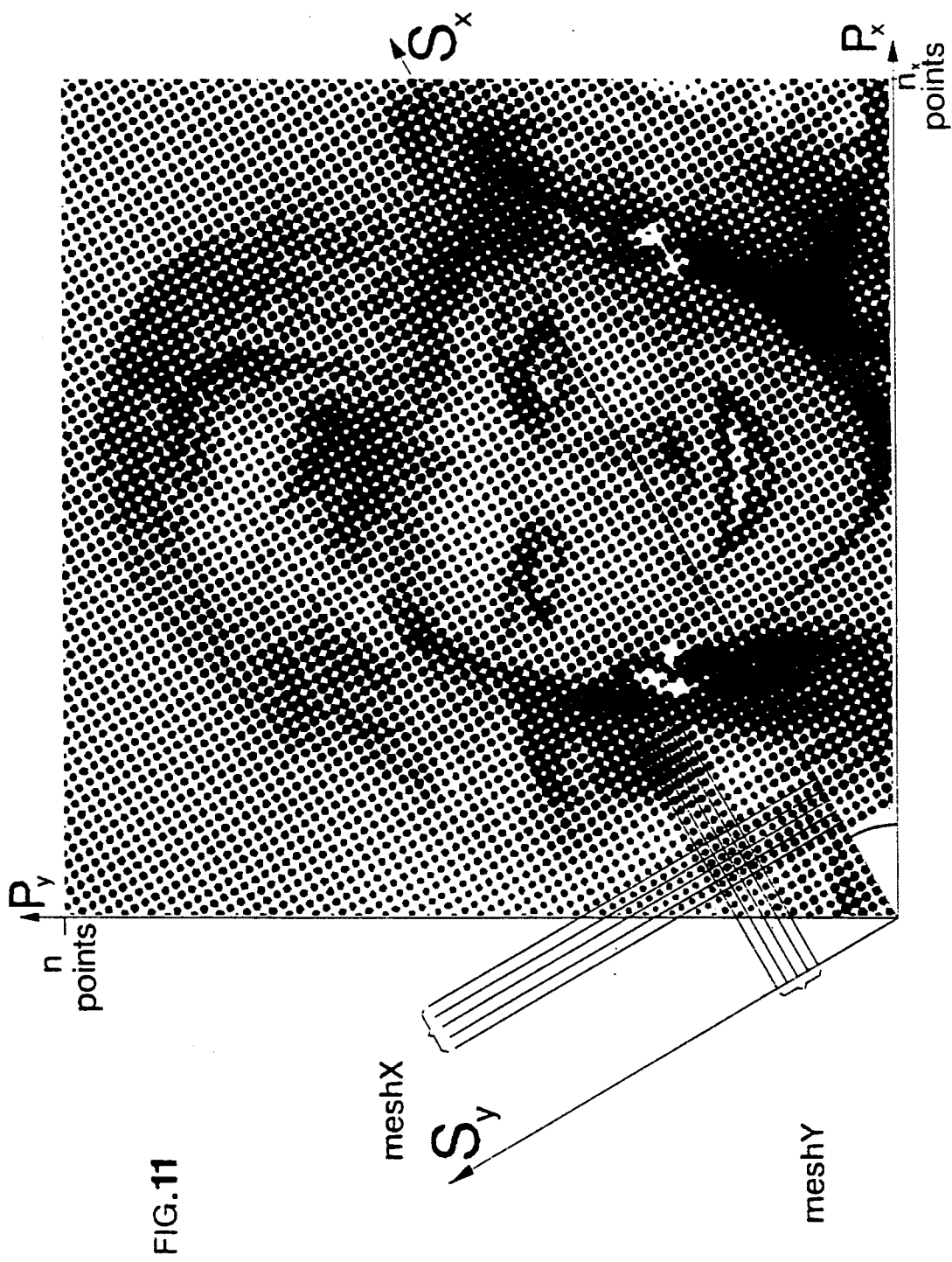
FIG. 11 is an output screened image produced according to the present invention.

FIG. 11 illustrates a screened halftone color separation produced in accordance with a preferred embodiment of the present invention. It is appreciated that the operator, using workstation 16, defines meshX and meshY and the screen rotation angle $\alpha$ of the output screen dots.

It will be appreciated by persons skilled in the art that the present invention is not limited by what has been particularly shown and described hereinabove. Rather the scope of the present invention is defined only by the claims which follow:

I claim:

1. A technique for generating a screened reproduction of an image comprising the steps of:
   providing a representation of an original having input density values of the original at various locations thereon;
   storing information representing a plurality of contours of desired dot configurations, corresponding to various possible density values for a multiplicity of screen dots;
   for each coordinate pair of a plotter, corresponding to a given location on the original, determining whether the coordinate pair lies inside or outside of a contour corresponding to the input density value of the original for that location, from among said input density values; and
   operating the plotter to write only if the coordinate pair lies inside the contour, thereby to produce the multiplicity of screen dots of sizes representing the input density values of the original.

2. A technique according to claim 1 and wherein the stoerd information representing a plurality of contours stores only octants of the contour.

3. A technique according to claim 1 and wherein the stored information representing a plurality of contours is represented by arcs centered on given locations.

4. A technique according to claim 1 and wherein said step of providing a representation comprises scanning the original using a laser scanner having a first pixel resolution.

5. A technique according to claim 4 and wherein said multiplicity of screen dots are arranged in a screen grid having a second resolution, coarser than the first pixel resolution.

6. A technique according to claim 5 and wherein representation of the original is arranged in a scanner grid pattern and said screen grid is angled with respect to the scanner grid pattern.

7. A technique according to claim 1 and wherein said step of storing information comprises storing information relating to a plurality of selectable different dot configurations.

8. A technique according to claim 1 and wherein said means for operating the plotter is operative to cause the plotter to write with a resolution finer than the first pixel resolution.

9. A technique according to claim 3 and wherein the stored information includes an indication of the coordinates of the center of the arc, its radius and a flag indicating whether the center of the arc is within or without the dot configuration.

10. Apparatus for generating a screened reproduction of an image comprising:
- means for providing a representation of an original having input density values of the original at various locations thereon;
- means for storing information representing a plurality of contours of desired dot configurations, corresponding to various possible density values for a multiplicity of screened dots;
- means for determining, for each coordinate pair of a plotter, corresponding to a given location on the original, whether the coordinate pair lies inside or outside of a contour corresponding to the input density value of the original for that location, from among said input density values; and
- means for operating the plotter to write only if the coordinate pair lies inside the contour, thereby to produce the multiplicity of screen dots of sizes representing the input density values of the original.

11. Apparatus according to claim 10 and wherein the stored information representing a plurality of contours stores only octants of the contour.

12. Apparatus according to claim 10 or claim 11 and wherein the stored information representing a plurality of contours is represented by arcs centered on given locations.

13. Apparatus according to claim 10 and wherein said means for providing a representation comprises a laser scanner having a first pixel resolution.

14. Apparatus according to claim 13 and wherein said multiplicity of screen dots are arranged in a screen grid having a second resolution, coarser than the first pixel resolution.

15. Apparatus according to claim 14 and wherein representation of the original is arranged in a scanner grid pattern and said screen grid is angled with respect to the scanner grid pattern.

16. Apparatus according to claim 10 and wherein said means for storing information comprises information relating to a plurality of selectable different dot configurations.

17. Apparatus according to claim 10 and wherein said means for operating the plotter is operative to cause the plotter to write with a resolution finer than the first pixel resolution.

18. Apparatus according to claim 10 and also comprising operator control means including a workstation.

19. Apparatus according to claim 11 and wherein the stored information includes an indication of the coordinates of the center of the arc, its radius and a flag indicating whether the center of the arc is within or without the dot configuration.

* * * * *